United States Patent [19]

Ogino et al.

[11] Patent Number: 5,430,357
[45] Date of Patent: Jul. 4, 1995

[54] UNIFORMITY CORRECTION SIGNAL GENERATING APPARATUS FOR DISPLAY IMAGE

[75] Inventors: Masanori Ogino, Yokohama; Takashi Itoh, Hiratsuka; Miyuki Ikeda; Toshiyuki Kimoto, both of Yokohama; Satoshi Ohtomo, Fujisawa, all of Japan

[73] Assignee: Hitachi, Ltd., Japan

[21] Appl. No.: 208,239

[22] Filed: Mar. 10, 1994

[30] Foreign Application Priority Data

Dec. 10, 1993 [JP] Japan .................. 5-310111

[51] Int. Cl.6 .............................................. G09G 1/28
[52] U.S. Cl. ............................................ 315/368.13
[58] Field of Search ................................ 315/368.13

[56] References Cited

U.S. PATENT DOCUMENTS

| | | | |
|---|---|---|---|
| 4,203,054 | 5/1980 | Sowter | 315/368.13 |
| 4,422,019 | 12/1983 | Meyer | 315/368.13 |
| 4,871,948 | 10/1989 | Nelson | 315/368.13 |
| 4,980,614 | 12/1990 | Yamada et al. | 315/368.13 |
| 5,194,783 | 3/1993 | Ogino et al. | 315/368.13 |
| 5,216,497 | 6/1993 | Tsujihara et al. | 315/368.13 |

OTHER PUBLICATIONS

"Large-Screen HDTV Monitor Development" by L. Thorpe et al., Aug. 1990, pp. 620–633.

*Primary Examiner*—Theodore M. Blum
*Attorney, Agent, or Firm*—Evenson, McKeown, Edwards & Lenahan

[57] ABSTRACT

A uniformity correction signal generating apparatus includes a horizontal address signal generating unit and a vertical address signal generating unit for generating address signals (X) and (Y, y) having one-to-one correspondence to a position on a display screen of a display unit, respectively. Upper and lower adjacent lattice point data are read out from an $E^2PROM$ on the basis of the address signals X and Y. Interpolated correction data are obtained on the basis of the upper and lower lattice point data and vertical lower address coordinates y. The apparatus is suitable for an auto-scan type display unit and can correct the uniformity for gradation and focus by using the inexpensive $E^2PROM$ without need of a large capacity expensive $E^2PROM$.

5 Claims, 9 Drawing Sheets

UNIFORMITY CORRECTION SIGNAL GENERATING APPARATUS FOR DISPLAY IMAGE

BACKGROUND OF THE INVENTION

The present invention relates to a uniformity correction apparatus for gradation and focus for reducing local unevenness in brightness, color and focus in a display screen to be able to produce a beautiful and faithful image.

Figure 1:
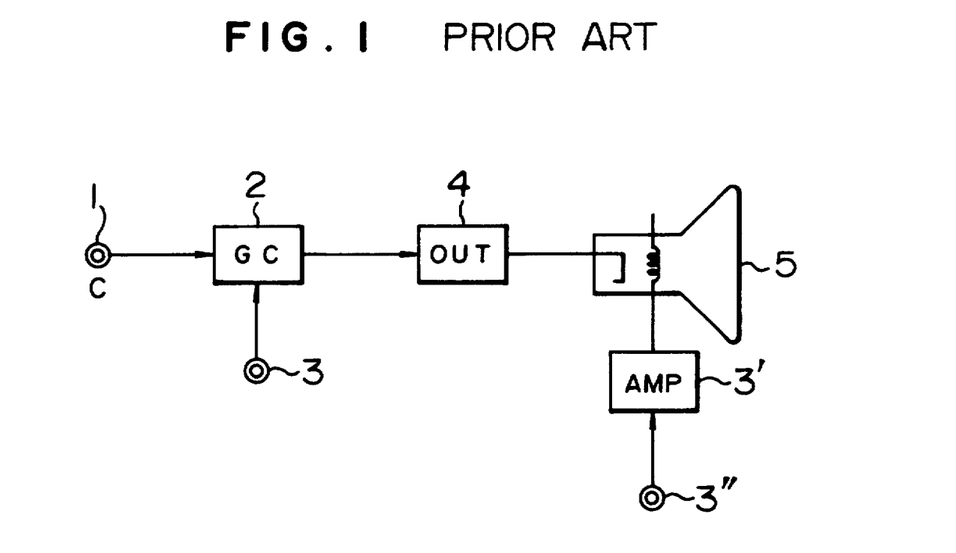
FIG. 1 is a block diagram schematically illustrating a conventional CRT display unit.

FIG. 1 is a schematic diagram illustrating a typical CRT display in a prior art. In FIG. 1, numeral 1 denotes an input image signal C, 2 a gain control circuit, 3 a gain control terminal, 4 an output amplifier, 5 a CRT, 3" a focus control signal input terminal, and 3' a focus control amplifier.

Recently, the degree of the uniformity required for the display screen increases rapidly as application fields of an image display are spread. Thus, a digital circuit technique is utilized to try to improve a screen picture.

Figure 2:
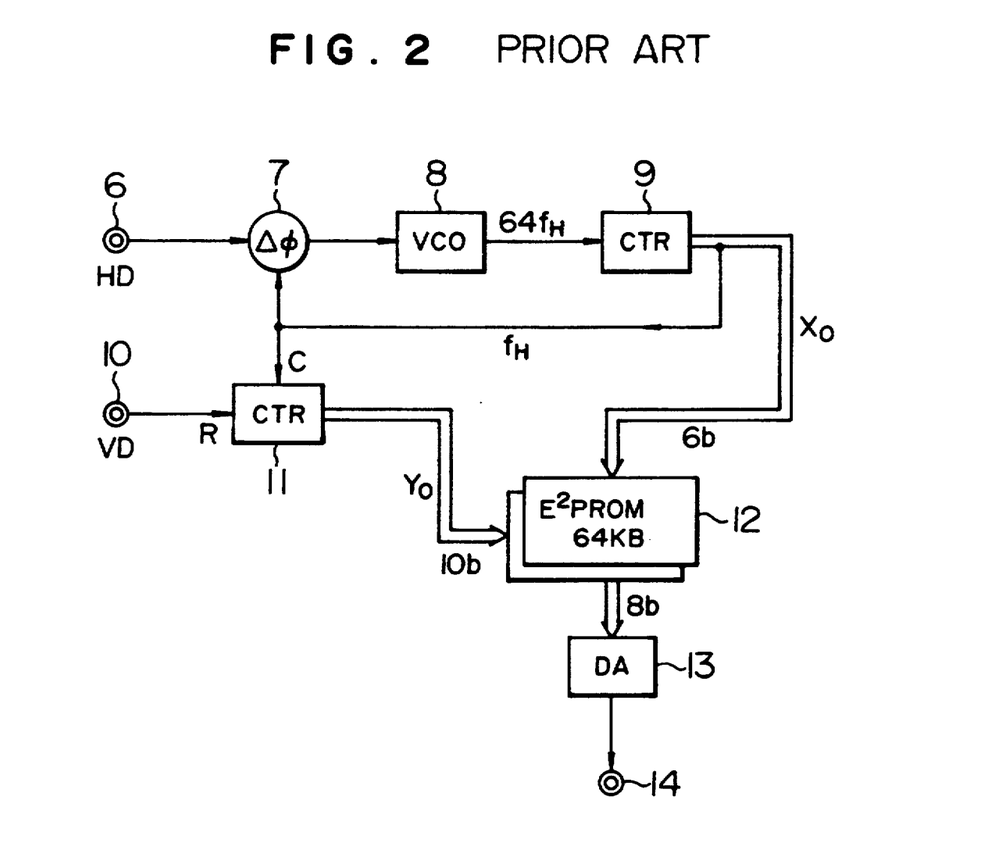
FIG. 2 is a block diagram schematically illustrating a conventional uniformity correction apparatus.

An example of a conventional technique is shown in FIG. 2. In FIG. 2, numeral 6 denotes a horizontal synchronizing signal input terminal, 7 a phase detector, 8 a voltage controlled oscillator and 9 a counter. The phase detector 7, the voltage controlled oscillator 8 and the counter 9 constitute a known PLL circuit. The counter 9 produces a 6-bit horizontal position signal Xo.

Numeral 10 denotes a vertical synchronizing signal input terminal and 11 a counter for counting the number of scanning lines and which is reset by a vertical synchronizing signal. The counter produces a vertical position signal Yo. When the number of scanning lines of the input signal is 1000, the bit number of Yo is 10 bits.

Numeral 12 denotes an E$^2$PROM (64K bytes) for storing data for uniformity correction of a screen. The E$^2$PROM is supplied with the horizontal and vertical position signals Xo and Yo as its input address signals and produces the correction data. Numeral 13 denotes a D/A converter which produces an analog signal. Numeral 14 denotes an output terminal.

When the uniformity of gradation is to be corrected, the output terminal 14 of FIG. 2 is connected to the terminal 3 of FIG. 1.

When the uniformity of focus is to be corrected, the terminal 14 is connected to the terminal 3".

When the uniformities for gradation and focus are to be corrected simultaneously, two circuits shown in FIG. 2 are required therefor.

As U.S. patents relevant to the present invention, there are U.S. Pat. Nos. 5,194,783 and 4,980,614. Moreover, a single scan display is disclosed in "Large-Screen HDTV Monitor Development" by L. Thorpe et al, August 1990, pp 620~633.

The prior art technique disclosed in the U.S. patents performs satisfactorily in a dedicated display unit for displaying a signal in a single scanning format.

However, when it is applied to a so-called auto-scan type display unit capable of treating a plurality of scanning formats, the prior art technique is unsatisfactory because the address signals Xo and Yo do not have one-to-one relation to position coordinates on the screen.

Accordingly, heretofore, there is provided a dedicated E$^2$PROM's 12 for each scanning format, and when the scanning format for the input signal is changed over, the E$^2$PROM's 12 are required to be switched in synchronism with the changing-over of the scanning format.

In other words, heretofore, it is necessary to use many expensive E$^2$PROM's in accordance with the scanning formats.

It is also necessary to switch the E$^2$PROM's in accordance with the scanning format of the input signal.

SUMMARY OF THE INVENTION

It is an object of the present invention to solve the problems in the prior art and to provide a uniformity correction apparatus for gradation and focus suitable for an auto-scan type display unit.

In order to achieve the above object, the present invention comprises means for generating an address signal having one-to-one correspondence to position coordinates on a display screen.

Further, the display screen is divided into small areas of about 64 (horizontal direction)×10 (vertical direction) and data corresponding to a center point of each of the small areas is stored in the E$^2$PROM. Interpolation means are provided for interpolating data required in the remaining portions in the vertical direction.

The address signal generating means generates horizontal and vertical address signals having one-to-one correspondence to the position coordinates on the display screen.

The bit number of the horizontal address signal is usually set to 8 bits and the bit number of the vertical address signal is usually set to a value larger than 8 bits.

The upper 4 bits of the vertical address signal and the horizontal address signal (8 bits) are used as an input address signal to the E$^2$PROM and correction data for representative lattice points (the "center points" referred to above of about 10×256 (4 bits+8 bits) are produced from the E$^2$PROM.

Correction data for the remaining points except the representative lattice points are interpolated from the data for the representative lattice points by the interpolation means.

Other objects, advantage and novel features of the present invention will become apparent from the following detailed description of the invention when considered in conjunction with the accompanying drawings.

DESCRIPTION OF THE PREFERRED EMBODIMENTS

Figure 3:
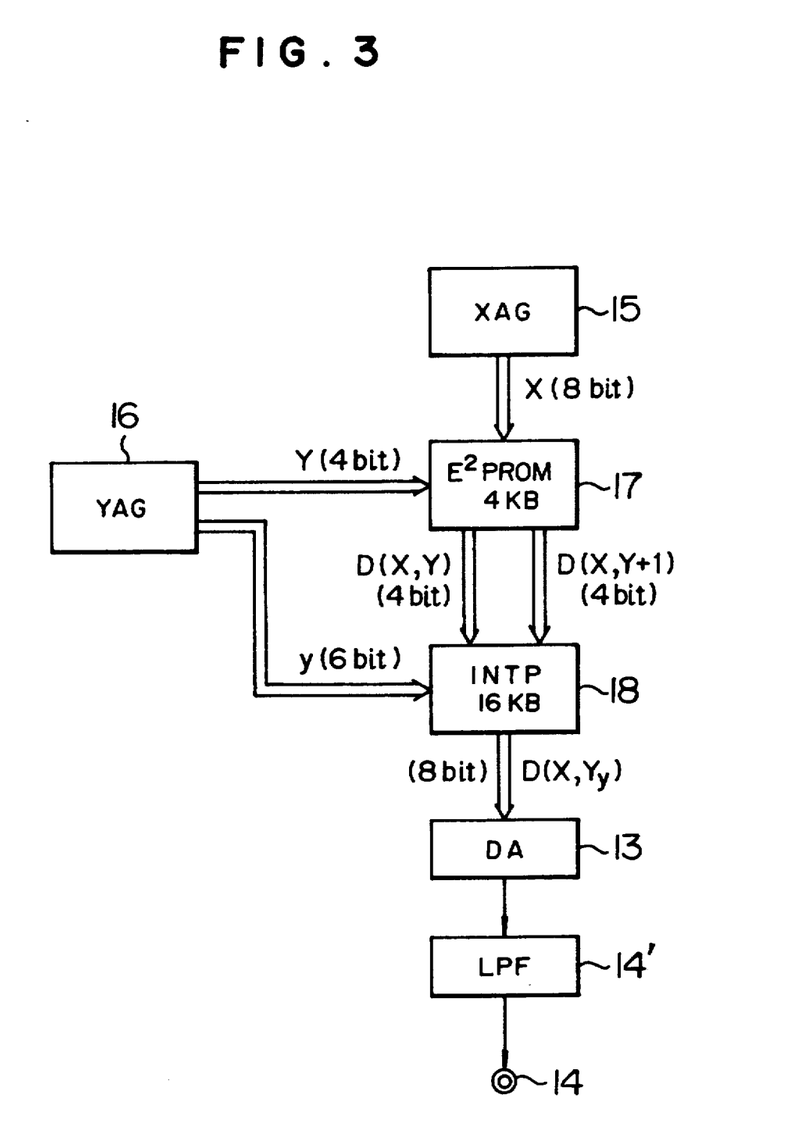
FIG. 3 is a block diagram schematically illustrating an embodiment of the present invention.

An embodiment of the present invention is illustrated in FIG. 3. In FIG. 3, numeral 15 denotes a horizontal address signal generator for generating an 8-bit horizontal address signal X having one-to-one correspondence to horizontal position coordinates on a display screen, 16 a vertical address signal generator for generating 10-bit vertical address signals Y (upper 4 bits) and y (lower 6 bits) having one-to-one correspondence to vertical position coordinates on the screen, 17 an E$^2$-PROM of 4K bytes, 18 interpolation means, 13 a D/A converter, 14 an output terminal, and 14' a low pass filter.

Operation of the embodiment shown in FIG. 3 is now described.

Data D (X, Y) and D (X, Y+1) are stored in upper four bits and lower four bits of a memory location having one byte in an address (X, Y) of the E$^2$PROM 17, respectively. Thus, the E$^2$PROM 17 produces the data D (X, Y) and D (X, Y+1) in response to the input signals X and Y. The interpolation means 18 is supplied with the four-bit data D (X, Y) and D (X, Y+1) and a six-bit vertical lower address signal y and produces an output D (X, Yy) expressed by an expression 1:

$$D(X, Yy) = \frac{D(X, Y+1)y + D(X, Y)(64 - y)}{64} \quad (1)$$

$$= D(X, Y) + D(X, Y+1) - D(X, Y)\frac{y}{64}$$

The expression 1 is a formula for linear interpolation. The output D (X, Yy) is supplied to the D/A converter 13 and the low pass filter (LPF) 14' and is produced from the terminal 14. The terminal 14 is connected to the terminal 3 or 3" of FIG. 1.

The interpolation means 18 can be configured by an EPROM of 16K bytes or by a multiplier circuit and an adder circuit.

In accordance with the embodiment, a memory capacity of the expensive E$^2$PROM can be reduced to 4K bytes from 64K bytes required in the prior art.

In the embodiment, the data D (X, Y) and D (X, Y+1) are stored in the E$^2$PROM 17.

Data {D(X,Y+1)−D(X,Y)} may be stored in the E$^2$PROM 17 instead of the data (X, Y+1). In this case, the last expression of the expression 1 is used as an interpolation expression.

Figure 4:
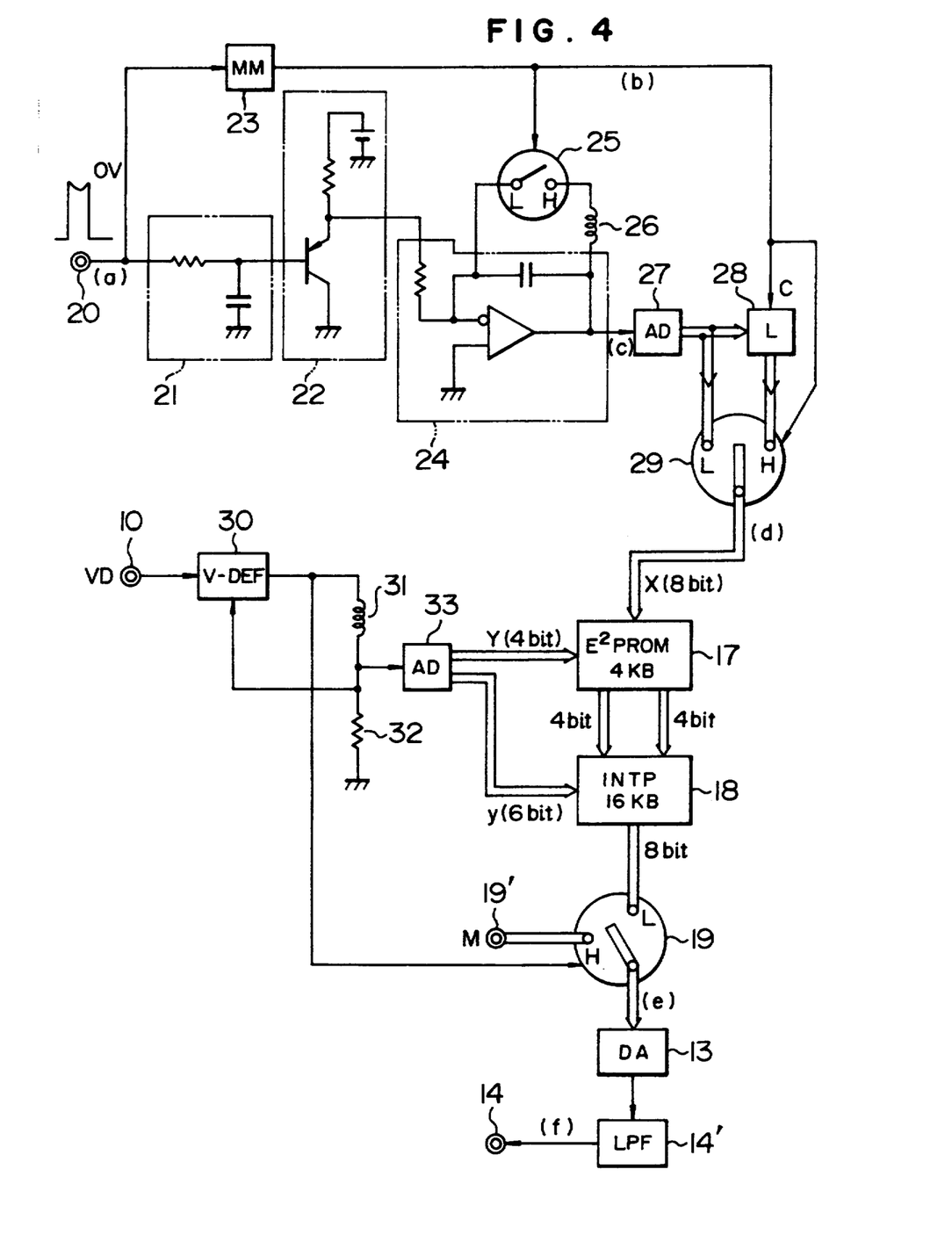
FIG. 4 is a block diagram schematically illustrating another embodiment of the present invention.
Figure 5:
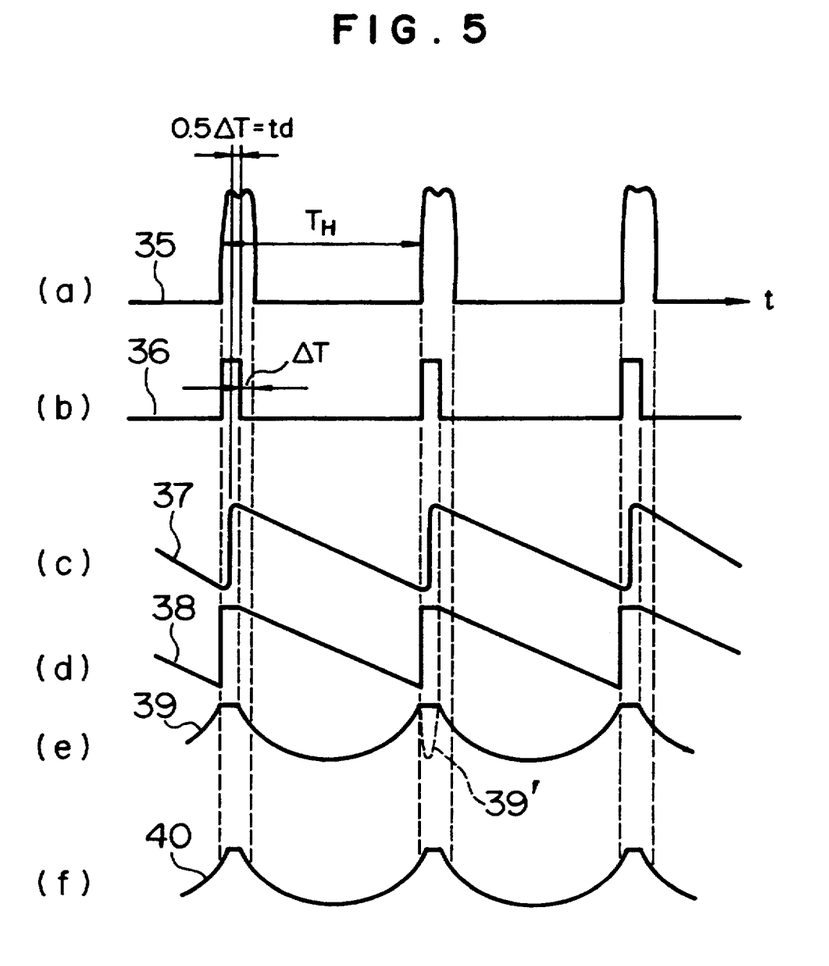
FIG. 5 is a waveform diagram for explaining operation of the embodiment illustrated in FIG. 4.

FIG. 4 illustrates another embodiment of the present invention. In FIG. 4, numerals 10, 13, 14', 14, 17 and 18 designate the vertical synchronizing signal input terminal, the D/A converter, the low pass filter, the output terminal, the E$^2$PROM and the interpolation means, respectively, in the same manner as in FIGS. 2 and 3. Numeral 20 denotes a horizontal retrace pulse input terminal, 21 an average value detection circuit, 22 a voltage follower, and 23 a monostable multivibrator having a pulse width which is selected to be ΔT narrower than a pulse width of the horizontal retrace pulse as shown in FIG. 5. The magnitude of ΔT is selected to be about twice as large as a total delay time td of the low pass filter and other transmission circuits of the correction signal. Numeral 24 denotes an integration circuit using an operational amplifier, and numeral 25 denotes an analog switch which is closed while the monostable multivibrator 23 produces a positive polarity pulse ("H" period) and is opened during the remaining period, that is, "L" period. Numeral 26 denotes an inductor having a value which is selected so that a half period of resonance of the inductor and a capacitor included in the integration circuit 24 is substantially equal to a pulse width of an output of the monostable multivibrator 23. Numeral 27 denotes an A/D converter, 28 a latch, 29 a digital switch, 30 a known vertical deflection circuit, 31 a vertical deflection yoke, 32 a resistor for detecting a vertical deflection current, 33 an A/D converter, and 19 a digital switch which is connected to an "H" side during a vertical retrace period and to an "L" side during a vertical scanning period. An intermediate constant value M (10000000 in the binary number in the embodiment) is applied to the "H" ) side of the digital switch 19 through a terminal 19'.

Operation of the embodiment of FIG. 4 is now described with reference to FIG. 5.

FIG. 5 is a waveform diagram of the horizontal period and its abscissa is time. Numerals 35, 36, 37, 38, 39 and 40 represent waveforms at nodes designated by (a), (b), (c), (d), (e) and (f) in FIG. 4, respectively.

As described above, the pulse width of the waveform (b) is narrowed by ΔT (two times of the delay time td of the subsequent correction signal transmission circuit) as compared with a pulse width of the waveform (a). The integration circuit 24 produces a sawtooth wave signal shown in the waveform (c). The sawtooth wave signal is subjected to the operation of the latch 28 so that an inclined portion of the horizontal retrace portion thereof is replaced by a flat portion at the output of the switch 29 to be the waveform (d). Since a parabolic function is previously stored in the E$^2$PROM 17, an output waveform of the horizontal period is as shown in the waveform (e). That is, a steep change indicated by broken line 39' is removed. The waveform is transmitted through the low pass filter 13 to be a waveform shown by 40. It will be understood from the comparison of the waveforms (a) and 40 that phases of both the waveforms are identical. The reason is that ΔT is selected to be about twice the delay time td.

Figure 6:
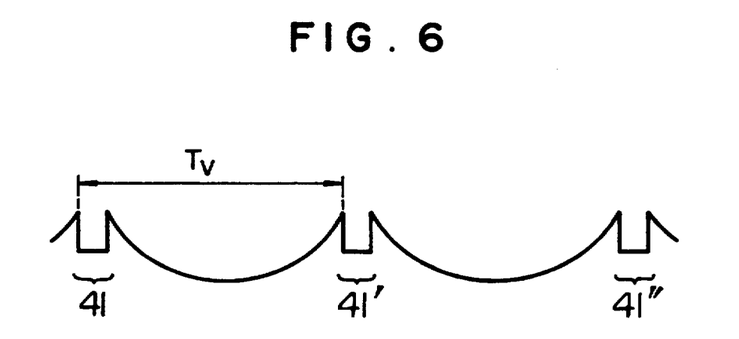
FIG. 6 is a waveform diagram for explaining operation of the embodiment illustrated in FIG. 4.

A waveform of the vertical period (Tv) is shown in FIG. 6. In FIG. 6, numerals 41, 41' and 41" represent the vertical retrace period and it is shown that the intermediate value is inserted by means of the operation of the digital switch 19 of FIG. 4. In FIG. 6, steep transient changes occur before and after the intermediate value but do not have any bad influence since the changes occur in a long-term scale of the vertical period.

In accordance with the embodiment, in addition to the features of the embodiment shown in FIG. 3, the address coordinates X, Y and y have one-to-one correspondence to position coordinates on the screen. Accordingly, the E$^2$PROM 17 can be used in common irrespective of the scanning format of the input signal.

Figure 7:
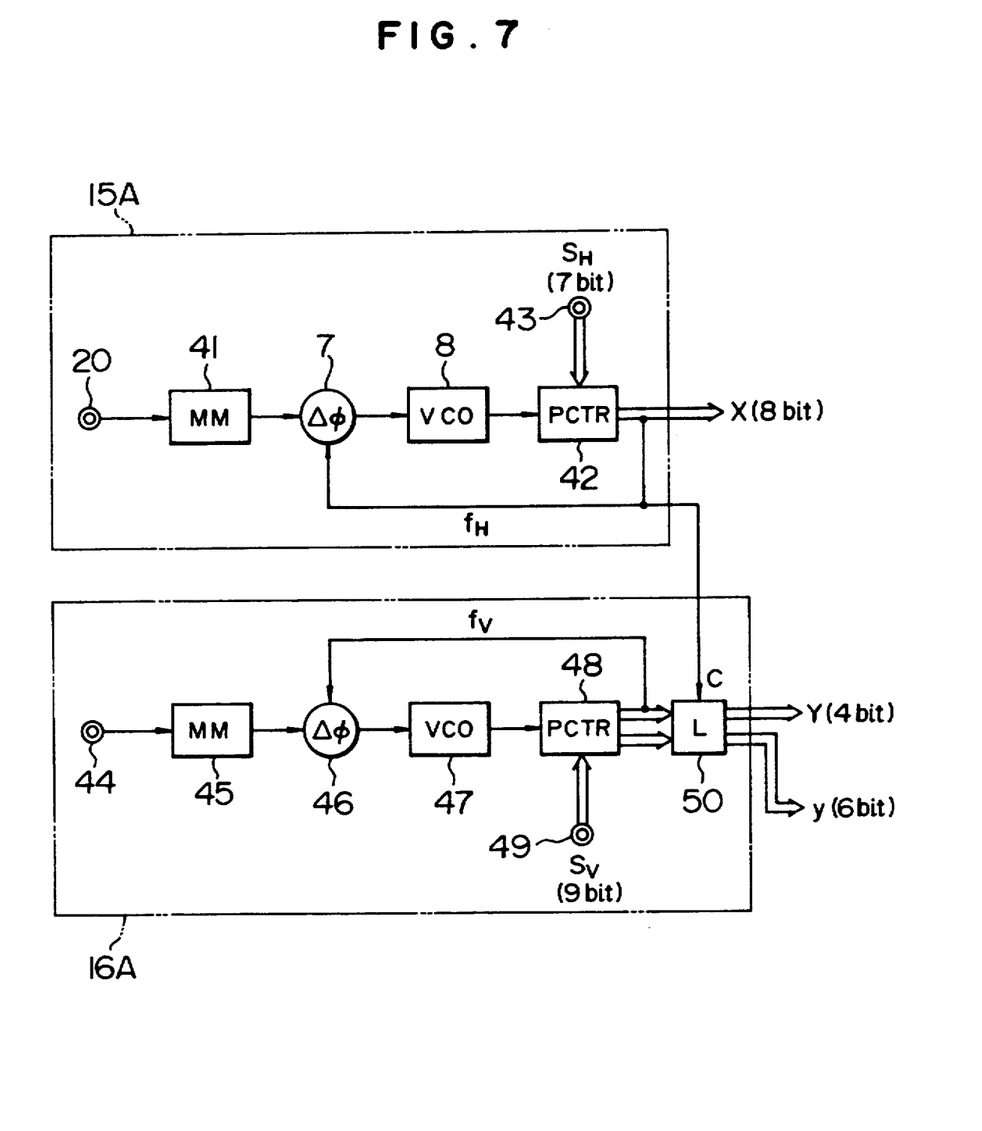
FIG. 7 is a block diagram schematically illustrating another embodiment of the present invention.

FIG. 7 illustrates another embodiment of the present invention.

FIG. 7 illustrates only an address generating unit. In FIG. 7, numerals 7, 8 and 20 designate the same elements as described above. Numeral 41 denotes a monostable multivibrator having a pulse width which is selected to be a value obtained by subtracting the delay time td from a half of the horizontal retrace pulse width. Numeral 42 denotes a programmable counter which counts from $-S_H$ to $+S_H$. $S_H$ is a value which is substantially proportional to the horizontal screen size and is inputted from a terminal 43 as a binary number of 7 bits. Numeral 44 denotes a horizontal retrace pulse input terminal, 45 a monostable multivibrator having a pulse width which is selected to be a half of the vertical retrace period, 46 a phase detector, 47 a voltage controlled oscillator, and 48 a programmable counter which counts $-S_v$ to $-S_v$. $S_v$ is a value which is substantially proportional to the vertical screen size and is inputted from a terminal 49 as a binary number of 9 bits. Numeral 50 denotes a latch.

Operation of the embodiment shown in FIG. 7 is now described.

The VCO 8 oscillates at about 256 $f_H$ ($f_H$ is the horizontal scanning frequency). The phase detector 7, the voltage controlled oscillator 8 and the programmable counter 42 constitute a horizontal PLL. Accordingly, it produces a horizontal address signal X of 8 bits which has substantially one-to-one correspondence to the horizontal position coordinates on the screen. This signal is supplied to the E²PROM 17 of FIG. 3. In other words, the circuit enclosed with broken line 15A of FIG. 7 is another definite example of the block designated by 15 of FIG. 3.

Similarly, the circuit enclosed with broken line 16A of FIG. 7 is another definite example of the block designated by 16 of FIG. 3.

Figure 8:
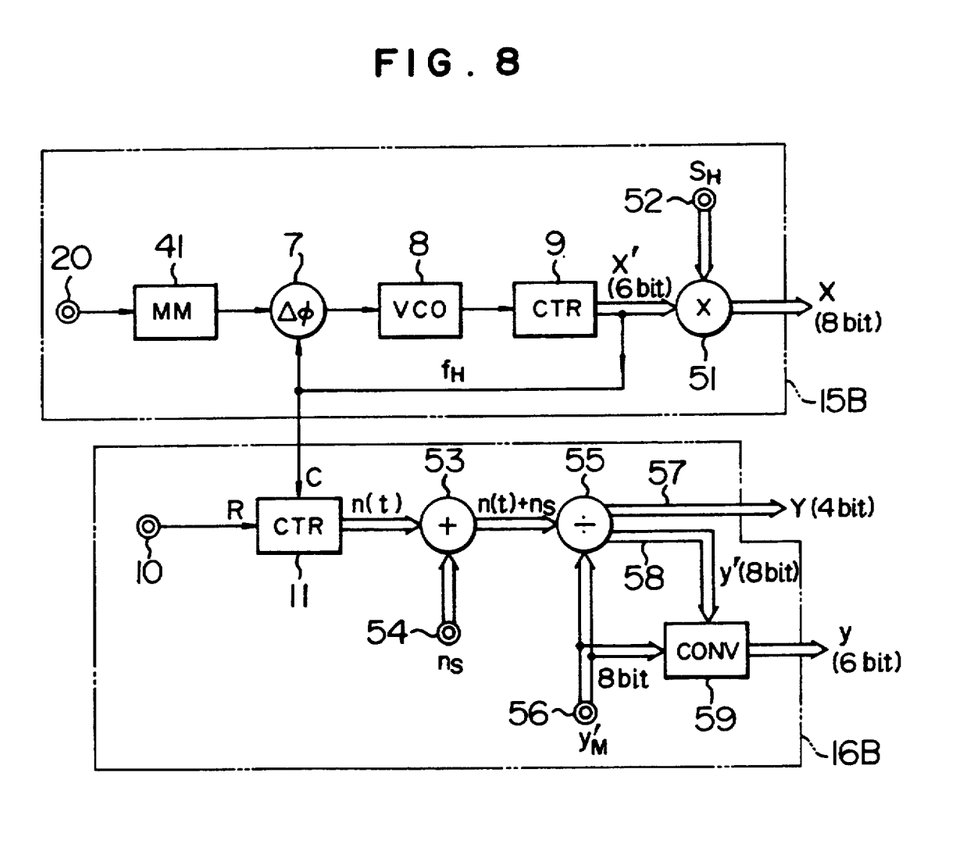
FIG. 8 is a block diagram schematically illustrating another embodiment of the present invention.

FIG. 8 illustrates another embodiment of the present invention.

FIG. 8 is a modification of FIG. 7. The circuit enclosed with broken line 15B is a horizontal address generating unit and the circuit enclosed with broken line 16B is a vertical address generating unit. Numerals 20, 41, 7, 8 and 9 in the broken line 15B designate the same elements as described above. Numeral 51 denotes a multiplier and numeral 52 denotes a terminal for inputting a signal for the horizontal size $S_H$. A value of $S_H$ is equal to 1.0 for the standard size, larger than 1 for the overscan, and smaller than 1 for the underscan. Numerals 10 and 11 in the broken line 16B designate the same elements as described above. Numeral 53 denotes an adder, 54 a terminal for inputting a start point $n_s$ to the adder, 55 a divider, 56 a terminal for inputting a divisor $Y_M'$ to the divider, 57 a quotient Y of the division, 58 a residual y' of the division, and 59 a converter for converting the residual y' into world coordinates y.

Operation of the embodiment shown in FIG. 8 is now described.

An output X of the multiplier 51 is proportional to the horizontal size $S_H$. Accordingly, the output X has one-to-one correspondence to the horizontal position coordinates on the screen.

The divider 55 performs the division operation shown by the following expression 2.

$$\frac{(n(t) + ns)}{y_M'} = Y + \frac{y'}{y_M'} \quad (2)$$

$$y' < y_M'$$

In the expression 2, n(t) is an output of the counter 11 and $n_s$ is the start point as described above. $Y_M'$ is the number of actual scanning lines in one section of the representative lattice in the horizontal direction. A value of $Y_M'$ is inputted from the terminal 56 as a value which is substantially proportional to the total number of the scanning lines of the input signal (about 1/10 of the total number of the scanning lines).

The converter 59 performs the proportional conversion operation shown by the following expression 3.

$$y = \frac{64y'}{y_M'} \quad (3)$$

Figure 9:
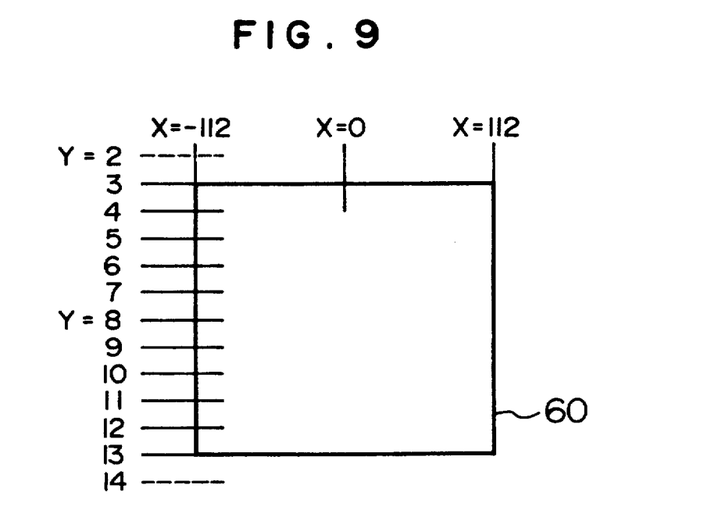
FIG. 9 illustrates coordinates for explaining operation of the embodiment illustrated in FIG. 8.

Values of X and Y obtained from the above description are shown on the screen as in FIG. 9. In FIG. 9, numeral 60 designates a screen frame. It will be understood from FIG. 9 that the values of X and Y have one-to-one correspondence to the position coordinates on the screen.

In the embodiments of the present invention described above, data D (X, Y) to be stored in the E²PROM 17 are written from a microcomputer separately. At this time, the total number of addresses is the total number of the permutation of (X, Y), that is, is as large as 4096 (8 bits + 4 bits). Actually, about 16 representative points are disposed at equal intervals in the horizontal direction.

More particularly, in adjustment of correction data values, attention is paid to only 16 × 16 (256) representative lattice points to set data values and the linear interpolation operation is performed in a microcomputer for data values of the remaining addresses to be stored in the E²PROM 17.

In order to further reduce the adjustment process, attention is paid to only 9 macro representative lattice points on the screen to perform the adjustment operation and the remaining data values can be interpolated by the microcomputer to thereby determine the data values automatically. This is illustrated in FIG. 10 as another embodiment.

Figure 10:
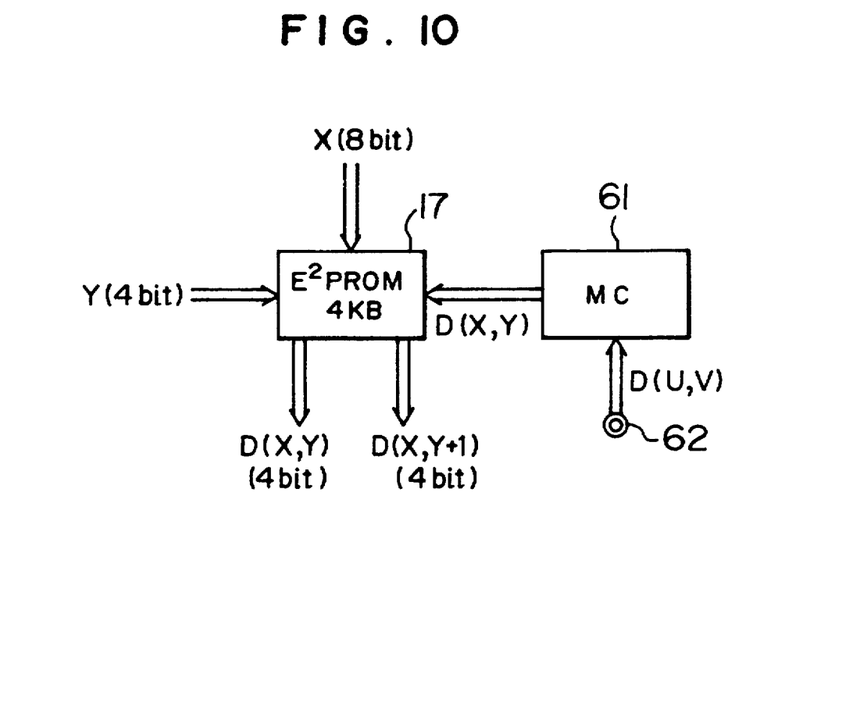
FIG. 10 is a block diagram schematically illustrating another embodiment of the present invention.
Figure 11:
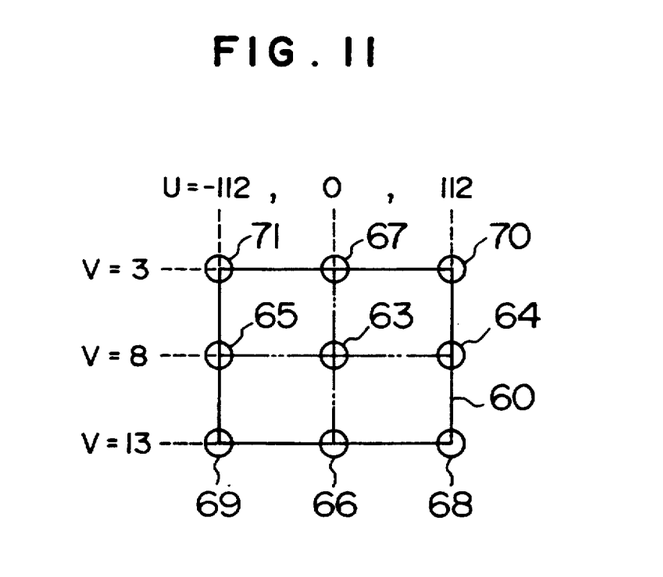
FIG. 11 illustrates coordinates for explaining operation of the embodiment illustrated in FIG. 10.

In FIG. 10, numeral 17 designates the same element as the E²PROM 17 of FIG. 3. Numeral 61 denotes a microcomputer and numeral 62 denotes a terminal for inputting data D (U, V) of macro representative lattice points to the microcomputer. U has three values of $-112$, 0 and 112, and V has three values of 3, 8 and 13. Positions on the screen for the macro representative lattice points are shown in FIG. 11. In FIG. 11, numeral 60 denotes a screen frame, 63 a center of the screen, 64 to 67 middle points at four peripheral sides, and 68, 69, 70 and 71 four corners.

The microcomputer 61 interpolates D (X, Y) from 9 macro lattice point data D (U, V) on the basis of the following hierarchically polynomial expression 4:

$$D(X, Y) = D(0, 8) + D(112, 8)\frac{X(X + 112)}{112 \cdot 224} + \quad (4)$$

$$D(-112, 8)\frac{X(X - 112)}{(-112) \cdot (-224)} + D(0, 13)\frac{(Y - 8)(Y - 3)}{5 \cdot 10} +$$

$$D(0, 3)\frac{(Y - 8)(Y - 13)}{(-5) \cdot (-10)} +$$

$$D(112, 13)\frac{X(X + 112)(Y - 8)(Y - 3)}{112 \cdot 224 \cdot 50 \cdot 10} +$$

$$D(-112, 13)\frac{X(X - 112)(Y - 8)(Y - 3)}{(-112) \cdot (-224) \cdot 5 \cdot 10} +$$

-continued $$D(112, 3) \frac{X(X + 112)(Y - 8)(Y - 13)}{112 \cdot 224 \cdot (-5) \cdot (-10)} +$$

$$D(-112, 3) \frac{X(X - 112)(Y - 8)(Y - 13)}{(-112) \cdot (-224) \cdot (-5) \cdot (-10)}$$

Terms in the right side of the above expression correspond to the macro lattice points of 63, 64, ... 71 of FIG. 11 in order, respectively. A value of each of four terms corresponding to four corners (68 to 71) of the screen is zero at the remaining 8 points. Accordingly, there is no interference between the lattices. A value of each term corresponding to the middle point of the four peripheral sides is zero at the remaining 5 points except the four corners. Accordingly, there is no interference between the lattices. The term D (0,8) corresponding to the center of the screen is a constant which is not depending on the position coordinates of the screen.

Accordingly, by setting the adjustment order to 63→(64, 65, 66, 67)→(68, 69, 70, 71), that is, the center→the sides→the corners, independent adjustment having no interference between the lattices can be realized. In other words, the uniformity of the screen can be improved by the minimum adjustment process. This highly desirable property is realized by virtue of the hierarchical structure of the polynomial of the equation (4). That is, the order of degree is the zeroth degree for the center of the screen, the second degree for each midpoint of the sides of the screen, and fourth degree for the four corners of the screen respectively, of address coordinates (X, Y), as noted above.

The essential point of the embodiment is that the correction function is formed as an integral function of the address coordinates and the adjustment is performed so as to add a function of the high degree successively starting from a function of the low degree, so that the interference between the macro representative lattice points is eliminated to attain effective adjustment. In the above example, the center of the screen corresponds to the polynomial expression of the zeroth degree of the address coordinates X, Y, each middle point of the four sides corresponds to the polynomial expression of the second degree, and the four corners correspond to the polynomial expression of the fourth degree.

A local modification of the embodiment illustrated in FIG. 4 is now described.

Figure 12:
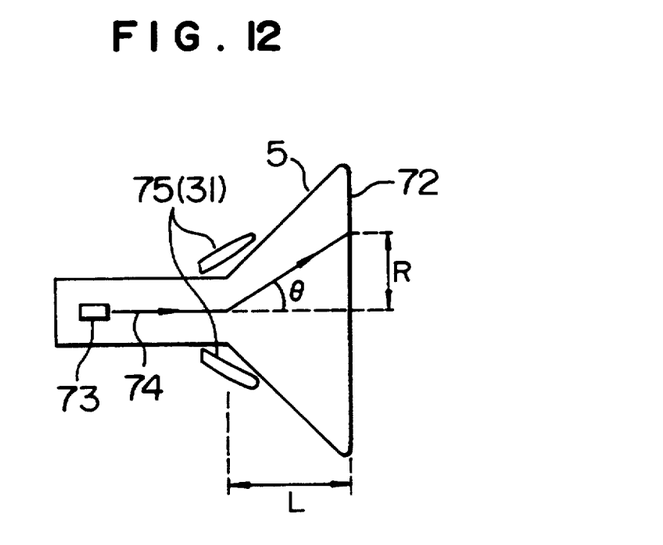
FIG. 12 is a diagram for explaining electromagnetic deflection operation of a CRT display unit.
Figure 13:
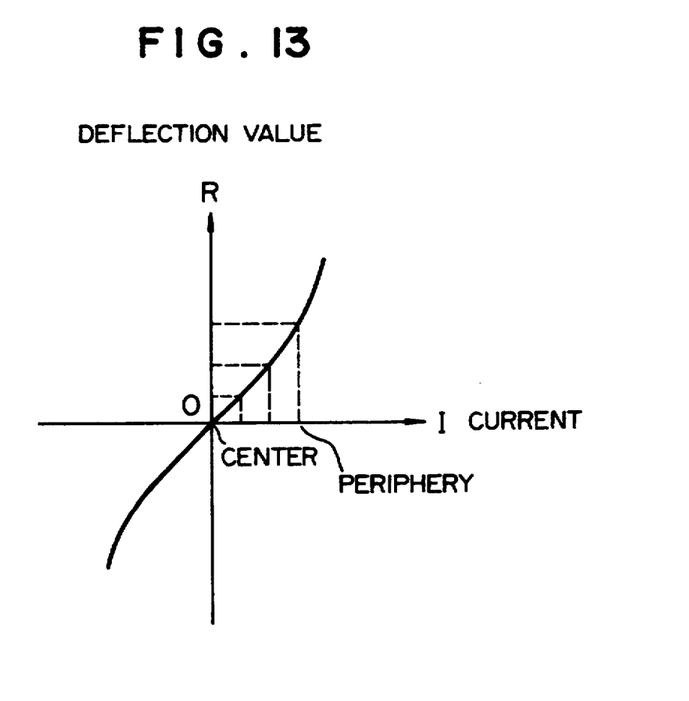
FIG. 13 is a diagram for explaining the electromagnetic deflection operation in conjunction with FIG. 12.

Referring to FIG. 12, the electromagnetic deflection physics are described. In FIG. 12, numeral 5 denotes a CRT, 72 a screen of the CRT, 73 an electron gun, 74 an electron beam, 75 deflecting yokes, L a distance between the screen and the deflection center, and R a deflection value. As apparent from FIG. 12, the deflection value R is proportional to the tangent of a deflection angle $\theta$. On the other hand, a deflecting coil current I is proportional to the sine of the deflection angle $\theta$. Accordingly, a differential dR/dI is increased with increase of $\theta$ as shown by the following expression 5. That is, the correspondence of R(I) is super-linear as shown in the graph of FIG. 13.

$$R = L\tan\theta \quad (5)$$

$$I \propto \sin\theta$$

-continued $$\therefore \frac{dR}{dI} \propto \frac{d\tan\theta}{d\sin\theta} = \frac{1}{\cos^3\theta}$$

In the above-mentioned embodiment shown in FIG. 4, the input to the A/D converter 33 is a value proportional to the vertical deflection current. Accordingly, the super-linear conversion is required in order to proportion the vertical address output signals Y and y to the deflection value R.

Figure 14:
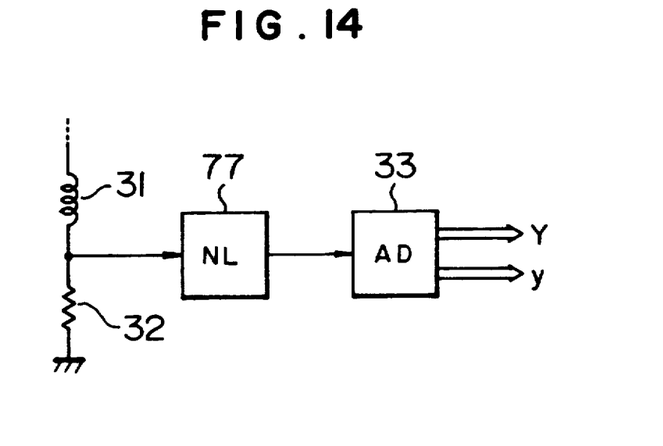
FIG. 14 is a block diagram illustrating a modification of the embodiment shown in FIG. 4.

FIG. 14 illustrates a local modification of FIG. 4. In FIG. 14, numeral 77 denotes a nonlinear super-linear converter having the input-output correspondence shown in FIG. 13 substantially. The converter may be used in the analog area as shown in FIG. 14 or may be realized by a ROM in the digital area after an A/D converter 33.

It is recommended that the nonlinearity of the conversion characteristic is further enhanced so that the distance on the screen of one section of the vertical address Y is wider in the screen center and narrower in upper and lower ends of the screen, since correction in the peripheral portion of the screen can be performed in more detail. The above description has been made for the vertical address signal, while the same is applicable to the horizontal address signal.

Figure 15:
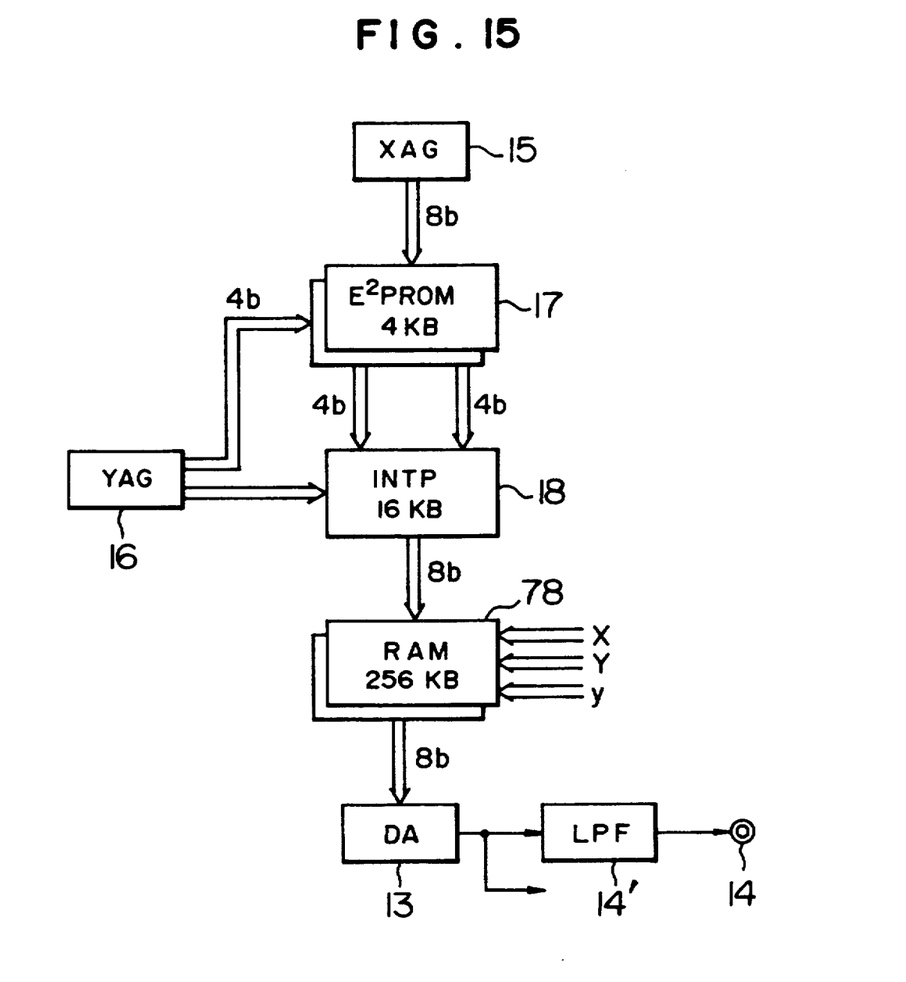
FIG. 15 is a block diagram illustrating a modification of the embodiment shown in FIG. 3.

FIG. 15 illustrates a local modification of the embodiment shown in FIG. 3. In FIG. 15, numeral 78 denotes a newly added RAM. Other configuration is the same as that of FIG. 3.

Operation of FIG. 15 is now described. The correction data stored in the E²PROM 17 is transferred to the SRAM 78 through the interpolation means 18 within about one second at the time of turning on of the power switch of the display. After completion of the transfer, the interpolated correction data is directly read out from the SRAM 78.

A merit of the modification is that when a reading time of data from the E²PROM is excessively long, it can be solved by the high-speed RAM. Further, when a plurality of kinds of corrections (for example, correction for brightness and correction for color) are required, the single interpolation means 18 can be shared.

According to the present invention, the expensive E²PROM requiring a large capacity in the prior art can be reduced to a small capacity.

Further, according to the present invention, the input signals of a plurality of kinds of different scanning formats can be followed to correct the uniformity of the display screen.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A uniformity correction signal generating apparatus comprising:

vertical address signal generating means for generating an address signal having at least one-to-one correspondence to position coordinates in a vertical direction on a display screen of a display unit, said address signal including an upper address signal Y and a lower address signal y;

memory means for storing a correction data corresponding to each value of said upper address signal Y, a correction data D(Y) corresponding to an address Y of said memory means being stored in a location of said address Y of said memory means; and ROM means for vertical interpolation for producing a correction data D(Y) and the lower address signal y, the correction data stored in said memory means being interpolated on the basis of at least 9 correction data values in a 3×3 macro lattice points on said screen, using a hierarchically structured interpolation polynomial expression, wherein a degree of said interpolation polynomial expression is the zeroth degree for a center of said screen, the second degree for each center of four peripheral sides of said screen and the fourth degree of address coordinates for each of four corners of said screen.

2. A uniformity correction signal generating apparatus according to claim 1, wherein said vertical address signal generating means is configured by digitizing a vertical deflection current proportional value of the CRT display unit by means of an A/D converter and said apparatus further comprising switch means for replacing an output of said interpolation ROM means by a constant value during a vertical retrace period.

3. A uniformity correction signal generating apparatus according to claim 1, further comprising horizontal address signal generating means for generating a horizontal address signal and including sawtooth wave generating means for generating a sawtooth wave of a horizontal period and an A/D converter, a retrace period of the sawtooth wave generated by said sawtooth wave generating means being ΔT shorter than a horizontal retrace period of the display unit, a value of said ΔT being selected to be equal to about two times a delay time of a correction signal transmission circuit.

4. A uniformity correction signal generating apparatus according to claim 1, wherein said vertical address signal generating means comprises a phase detection circuit, a voltage controlled oscillator and a programmable counter, and a start point and an end point of counting of said programmable counter are proportional to a vertical size of the screen.

5. A uniformity correction signal generating apparatus according to claim 1, wherein said vertical address signal generating means comprises a counter for counting actual scanning lines and conversion means for converting an output of said counter into universal coordinates, and said conversion means performs conversion so that any one section of said upper address signal Y is associated with a substantially equal distance on the screen.

* * * * *